US006802925B2

(12) United States Patent
Kobayashi et al.

(10) Patent No.: US 6,802,925 B2
(45) Date of Patent: Oct. 12, 2004

(54) LAMINATING FILM AND LAMINATION PROCESS USING THE SAME

(75) Inventors: Masaya Kobayashi, Kanagawa (JP); Toru Nagata, Tokyo (JP); Kenji Suzuki, Kanagawa (JP); Masami Tsukamoto, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 104 days.

(21) Appl. No.: 10/230,220

(22) Filed: Aug. 29, 2002

(65) Prior Publication Data

US 2003/0049422 A1 Mar. 13, 2003

(30) Foreign Application Priority Data

Aug. 31, 2001 (JP) ....................................... 2001-263723

(51) Int. Cl.[7] ............................. B32B 31/20; C09J 5/06

(52) U.S. Cl. ........................ 156/234; 156/247; 156/289; 156/308.2; 156/323; 428/32.79; 428/336; 428/346; 428/354; 428/914

(58) Field of Search ................................. 156/155, 230, 156/231, 234, 238, 247, 249, 289, 308.2, 323; 428/32.6, 32.77, 32.78, 32.79, 32.8, 32.81, 332–334, 336, 338, 343, 346, 352, 354, 914

(56) References Cited

U.S. PATENT DOCUMENTS

| | | | |
|---|---|---|---|
| 4,528,311 A | 7/1985 | Beard et al. | 524/91 |
| 5,427,997 A | 6/1995 | Oshima et al. | 503/227 |
| 5,527,759 A | 6/1996 | Oshima et al. | 503/227 |
| 5,646,089 A | 7/1997 | Oshima et al. | 503/227 |
| 5,728,645 A | 3/1998 | Oshima et al. | 503/204 |
| 6,291,062 B1 | 9/2001 | Oshima et al. | 428/323 |
| 6,656,543 B2 * | 12/2003 | Schuhmacher et al. | 428/1.2 |

FOREIGN PATENT DOCUMENTS

| | | | |
|---|---|---|---|
| JP | 6-73368 | 3/1994 | |
| JP | 6-91767 | 4/1994 | |
| JP | 7-126536 | 5/1995 | |
| JP | 9-118720 | 5/1997 | |
| JP | 2686657 | 8/1997 | |
| JP | 11-348199 | 12/1999 | |
| JP | 2000-44901 | 2/2000 | |
| JP | 2001-121609 | 5/2001 | |
| JP | 2002067240 A * | 3/2002 | B32B/27/30 |

OTHER PUBLICATIONS

English abstract of JP 2002–67240.*

* cited by examiner

*Primary Examiner*—Richard Crispino
*Assistant Examiner*—Sing P Chan
(74) *Attorney, Agent, or Firm*—Fitzpatrick, Cella, Harper & Scinto

(57) ABSTRACT

The present invention provides a laminating film which has a thin base material processable with a low energy and a protection layer capable of giving a high optical density and a high glossiness to a printed image by lamination, and to provide a process for lamination with the laminating film. The laminating film of the present invention comprises a base material, and an image protection layer formed on the base material and having at least an adhesion layer capable of adhering to an image surface, wherein the base material has a thickness ranging from 1.5 to 6.0 μm and has an arithmetic average roughness (Ra) of not more than 50 nm and a ten point height of roughness profile (Rz) ranging from 1200 nm to 2000 nm according to JIS B0601.

12 Claims, 2 Drawing Sheets

LAMINATING FILM AND LAMINATION PROCESS USING THE SAME

BACKGROUND OF THE INVENTION

1. Field of the Invention

The present invention relates to a laminating film constituted of a base material and an image-protection layer for protecting a printed image by lamination, and also relates to a lamination process for protection of a printed image using such laminating film. In particular, the present invention relates to a laminating film suitable for forming an image protection layer on a printed image by transferring the image protection layer from the base material of the laminating film by hot-pressing the image protection layer onto an image surface and peeling off the base material from the image protection layer, and also relates to a lamination process for protecting the image using the laminating film.

2. Related Background Art

Methods are known for completing an image formed by electrophotography or ink-jet printing in which a transparent resin layer provided on a base material is transferred by thermocompression bonding with the base material either peeled off or kept unpeeled for improvement of the smoothness or glossiness of the image. Such methods are disclosed in Japanese Patent Application Laid-Open Nos. 06-091767, 2001-121609, and so forth.

Generally, a pair of hot-pressing rollers are used for the thermocompression bonding of the transparent resin layer. The hot-pressing rollers makes the lamination apparatus larger inconveniently.

On the other hand, techniques are known to impart durability such as abrasion resistance to thermally transferred images or the like, in which a resin is transferred onto an image by a sublimation-transfer system or a thermal transfer system, as shown in Japanese patent No. 2686657.

SUMMARY OF THE INVENTION

The inventors of the present invention investigated miniaturization of the lamination apparatus for convenience by making the heater assembly smaller by using a thermal head in place of the conventional heating rollers. Generally, the heat capacity of the thermal head is smaller than that of the heating rollers employing a halogen-heater or the like. Accordingly, the base material of the laminating film should be thinner to improve the heat conduction from the heater assembly for efficient bonding of the adhesion layer of the laminate onto the image surface by means of the thermal head.

However, the laminating film having a base material designed thinner tends to stick to the production apparatus or the delivery member of the film delivery system to cause failure in delivery or winding-up. To solve the problem with the thinner base material of the conventional laminating film or cover film, the surface is made coarse. As the results of investigation by the inventors of the present invention, when an printed image formed by electrophotography or ink-jet printing is covered by lamination with a protection layer formed on a surface of a thin and rough base material, the roughness of the base material is transferred to the surface of the protection layer to cause irregular light reflection at the protection layer surface to render the entire image hazy and to significantly lower the optical density to deteriorate the image quality of the laminate, even though the water resistance, gas resistance, and light fastness are improved by the protection layer. In particular, image quality can be deteriorated by irregular reflection especially in high density regions of the original image (image before the lamination treatment). This is a serious problem in obtaining an image having a wide density-expression range like a photograph.

An object of the present invention is to provide a laminating film which has a thin base material processable with a low energy and a protection layer capable of giving a high optical density and a high glossiness to a printed image by lamination, and also to provide a process for lamination with the laminating film.

Another object of the present invention is to provide a laminating film for ink-jet prints and electrophotographic prints, particularly for ink-jet prints having a porous surface, and to provide a process for lamination employing the laminating film.

A further object of the present invention is to provide a highly light-resisting laminating film, and to provide a lamination process employing the laminating film.

After comprehensive investigation to solve the above problems, the inventors of the present invention completed the present invention.

The laminating film of the present invention comprises a base material, and an image protection layer formed on the base material and having at least an adhesion layer capable of adhering to an image surface, wherein the base material has a thickness ranging from 1.5 to 6.0 $\mu$m and has an arithmetic average roughness (Ra) of not more than 50 nm and a ten point height of roughness profile (Rz) ranging from 1200 nm to 2000 nm according to JIS B0601.

The lamination process of the present invention for laminating the image protection layer to an image surface of a printed product comprises the steps of (i) providing the above-described laminating film, (ii) bonding the adhesion layer of the laminating film onto the image surface of the printed product under heating, and (iii) peeling off the base material, from the image protection layer after step (ii).

DESCRIPTION OF THE PREFERRED EMBODIMENTS

The lamination process of the present invention for laminating the protection layer to a recording material is described prior to explanation of the laminating film of the present invention.

Figure 1:
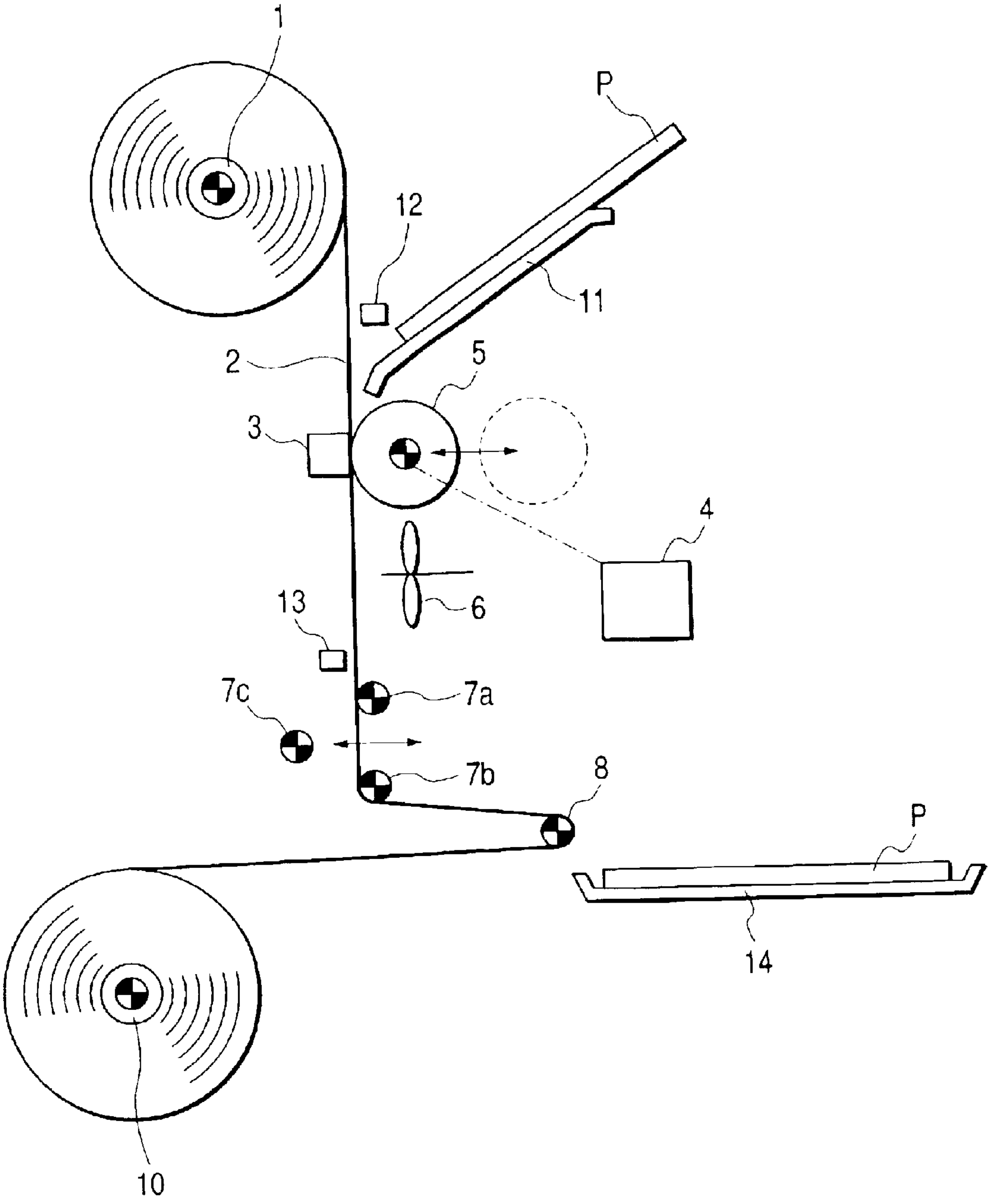
FIG. 1 illustrates schematically a process for laminating a protection layer of the laminating film of the present invention to a recording material.

FIG. 1 schematically illustrates a process for laminating a protection layer of the laminating film of the present invention to a recording material with a thermal head as the heating means.

In FIG. 1, the numeral 1 indicates a feed reel for unwinding a roll of a laminating film 2 wound with the protection layer kept outside. The feed reel 1 applies a backward tension (in a counterclockwise direction in the drawing) to the laminating film 2. The numeral 3 indicates a thermal head. The numeral 5 indicates a pressing roller for pressing the laminating film 2 against the thermal head. A rotary encoder 4 is provided on the axis of the pressing roller to detect the rotation. The pressing roller is operated under a linear pressure ranging from 0.5 to 3 N/cm, more preferably from 1.5 to 3 N/cm. The numeral 6 indicates a cooling fan for cooling the protection layer and the printed product P hot-pressed by the thermal head 3, and the pressing roller 5. The numerals 7*a*, 7*b* respectively indicate a fixation guide for fixing the rear end peeling portion and is rotatable around an axis. The numeral 7*c* indicates a movable peeling bar for peeling at the rear end portion serving to quickly push the rear end portion of the printed product P thermally press-bonded to the laminating film 2 with interposition of the protection layer, thereby peeling off the rear end portion of the printed product P from the base material of the laminating film with the protection layer bonded to the printed product P. The numeral 8 indicates a guide for front end peeling portion. When the printed product P passes the guide 8, the front end of the printed product P thermally press-bonded to the laminating film 2 with interposition of the protection layer is peeled off from the base material of the laminating film owing to the difference in rigidity. The numeral 10 indicates a take-up reel for the laminating film 2 after use, applying a tension in the take-up direction (counterclockwise in the drawing). The numeral 11 indicates a guide for the printed product P. The numeral 12 indicates a photo-interrupter constituting a first paper sheet passage sensor. The numeral 13 indicates a photo-interrupter constituting a second paper sheet passage sensor.

When the printed product P is introduced to the guide 11 and the first sheet passage sensor generates a signal of "presence", the pressing roller 5 is pressed against the thermal head 3. The laminating film 2 is fed at a linear speed ranging preferably from 10 to 150 mm/sec, more preferably from to 30 to 100 mm/sec. The printed product P is thermally press-bonded by the thermal head 3 and the pressing roller 5 to the laminating film 2 with the protection layer interposed. According to the angular position of the pressing roller 5 (the position specified by the angle determined by a specific position and datum position of the roll surface of the pressing roller, and the center of the pressing roller) at the time when the paper sheet passage sensor 13 detects the signal change from "presence" to "absence", the rotary encoder 4 monitors the angular position of the pressing roller 5 until the rear end of the printed product reaches the rear end peeling zone. When the rotary encoder 4 detects the angular position corresponding to the arrival of the rear end of the printed product at the rear end peeling zone, the movable peeling bar 7*c* peels off the rear end portion of the printed product from the base material of the laminating film 2.

Thereafter, the laminating film is delivered by the length for completion of the paper sheet discharge. The paper sheet discharge is conducted by monitoring the rotation of the pressing roller 5 corresponding to the length of the laminating film for the paper sheet discharge after the passage through the second paper sheet passage sensor 13. By the guide 8 which sharply bends the path, the base material of the laminating film 2 is sent along the bent path, whereas the printed product P passes the guide 8 without bending owing to its high rigidity. Thus, by the guide 8, the front end or the printed product is peeled off together with the protection layer from the base material of the laminating film 2. In the peeling step for the front end of the printed product, the protection layer bonded to the printed product is cut from the protection layer adhering to the laminating film base material. Since the rear end of the printed product has been peeled from the laminating film base material, the protection layer in the periphery of the printed product is completely cut off, not pulled in a fin-like state by the printed product. The printed product having the protection layer laminated on the image surface is discharged onto the discharged paper sheet tray 14.

The unused portion of the protection layer between the portion delivered from the position of the thermal head 3 to the front end peeling zone during the time from the front end peeling to the completion of the sheet discharge is reusable, since that portion including the portion nipped by the pressing roller 5 is subjected to heating treatment only. The unused portion is rewound to the heating roll position by rotating the pressing roller 5 in the clockwise direction by the angle corresponding to the length of the unused portion. After stop of the rotation, the pressing roller 5 is moved back to the non-pressing position.

In the present invention, the use of the thermal head is preferred as the heating means as shown in FIG. 1 in view of miniaturization of the apparatus. A lamination apparatus employing a heating roll as the heating means is also useful.

The laminating film in the present invention is described below.

Figure 2:
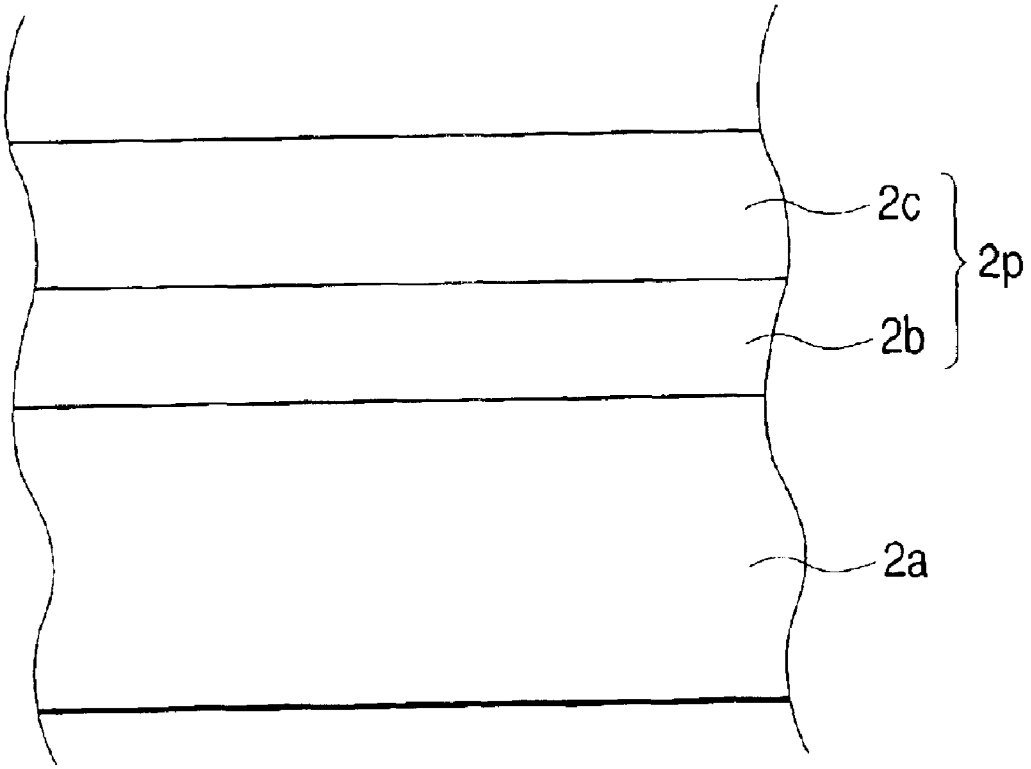
FIG. 2 is a sectional view of a laminating film of the present invention.

FIG. 2 is a sectional view of the laminating film of the present invention. The laminating film 2 of the present invention is constituted of a base material 2*a* and an image protection layer 2*p* laminated thereto. The image protection layer is constituted, for example, of a surface layer 2*b*, and an adhesion layer 2*c* laminated successively. The laminating film having such a constitution can be formed in a manner shown below.

(Base Material)

The base material is not limited, provided that it is capable of retaining its shape stably under the thermocompression condition or hot-pressing conditions for laminating the protection layer to the image surface of the printed product and that it can be peeled off from the protection layer after formation of the protection layer on the image surface of the printed product. The base material having such properties includes films and sheets of polyesters such as polyethylene terephthalate (hereinafter occasionally referred to as "PET"), polyethylene terephthalate-isophthalate copolymers, and polybutylene terephthalate; polyolefins such as polypropylene; polyamindes; polyimides; triacetylcellulose; polyvinyl chlorides; vinylidene chloride-vinyl chloride copolymers; acrylic resins; and polyether sulfones.

The thickness of the base material is preferably not more than 6 $\mu$m for effective adhesion by heating with a heating means of a low heat capacity such as a thermal head, and is preferably not less than 1.5 $\mu$m for ease of handling and the cost. For lamination of a glossy image surface of the print, specifically for lamination of glossy image surface having a Ra of 350 nm or less, the thickness of the base material ranges preferably from 1.5 to 4.5 $\mu$m, since correction of the roughness of the image surface of the printed product by replica of smooth surface of the base material is not necessary and the base material need not have high rigidity.

According to the comprehensive study made by the inventors of the present invention, decrease of the L* value change rate of the image in CIE-L*a*b* plane and decrease of OD change rate of the formed image can be significantly suppressed by making the arithmetic average roughness (Ra) to be not more than 50 nm and the ten point height of roughness profile (Rz) to be not more than 2000 nm which are parameters of surface roughness defined by JIS B0601. Thereby, a sharp image can be obtained by the lamination. With Ra of not more than 50 nm and Rz of not more than 2000 nm, the OD change rate can be kept to be not more than 20% independently of the surface material of the printed product. With Ra of not more than 30 nm, the OD change rate can be kept to be not more than 15%. Further, with Ra of not more than 18 nm, the OD change rate can be kept to be not more than 10%.

Further, according to the investigation made by the inventors of the present invention, since an excessively smooth film is not stably deliverable, Rz is preferably not less than 1200 nm, more preferably not less than 1600 nm.

The glossiness of the image is considered to depend primarily on the average roughness (Ra) of the face, and not to be considerably affected by not frequently appearing projections having a rather large height. On the other hand, the deliverability of the film in a mechanical apparatus is considered to depend on the state of contact of the film with the apparatus member like the roller and to be affected by the relatively few projections. From such consideration, the conclusion derived by the inventors is theoretically reasonable that the arithmetic average roughness (Ra) is preferably not more than 50 nm and the ten point height of roughness profile (Rz) ranges preferably from 1200 nm to 2000 nm which are parameters for surface roughness of the base material defined by JIS B0601.

The apparatus for measuring Ra and Rz is not specially limited provided that it is capable of conducting measurement defined by JIS B0601. However, the inventors of the present invention found that a stylus type tester used generally for surface roughness measurement results in greater variation of the data depending on the measurement points, relative hardness of the stylus touch with the image surface. As described above, extremely fine roughness of the laminating film of the present invention is important for simultaneous achievement of sufficient image density, image glossiness and film deliverability. In such a case, a non-contacting microscope capable of conducting three-dimensional surface structure analysis with a white light or a laser beam is suitable for precise evaluation of the surface structure of the base material and measurement of the surface roughness of the image surface. Thereby the effects of the present invention can be achieved more efficiently.

(Surface Layer)

The surface layer 2*b* of the laminating film of the present invention is constituted of a resin material (a polymer material) capable of serving as an image protection layer in a state of lamination on an image, and capable of forming a layer having necessary properties like transparency for appreciation of the image. The material includes resin material containing polymer material such as acrylic resins, styrenic resins, vinyl chloride resins, and vinyl acetate resins.

The acrylic resins include homopolymers of (meth) acrylate esters and copolymers thereof with other copolymerizable monomers (hereinafter referred to as (meth) acrylate ester type polymers). Incidentally the term "(meth) acrylate ester" and like terms signifies an acrylate ester or a methacrylate ester.

The (meth)acrylate ester for producing the aforementioned (meth)acrylate ester type polymer specifically include methyl (meth)acrylate, ethyl (meth)acrylate, isopropyl (meth)acrylate, n-butyl (meth)acrylate, n-hexyl (meth) acrylate, n-octyl (meth)acrylate, 2-ethylhexyl (meth) acrylate, isononyl (meth)acrylate, and lauryl (meth)acrylate. The (meth)acrylate ester may be used singly or in combination with another copolymerizable monomer for production of the (meth)acrylate ester type polymer.

The aforementioned another monomer copolymerizable with the (meth)acrylate ester specifically includes unsaturated carboxylic acids such as (meth)acrylic acid, crotonic acid, maleic acid, fumaric acid, and itaconic acid; hydroxyl group-containing monomers such as hydroxyethyl (meth) acrylate, hydroxypropyl (meth)acrylate, and hydroxybutyl (meth)acrylate; alkoxy group-containing monomers such as methoxyethyl (meth)acrylate, and ethoxyethyl (meth) acrylate; glycidyl group-containing monomers such as glycidyl (meth)acrylate, and allyl glycidyl ether; cyano group-containing monomers such as (meth)acrylonitrile; styrenic monomers such as styrene, and α-methylstyrene; aromatic ring-containing monomers such as phenyl (meth)acrylate, and benzyl (meth)acrylate; amide group-containing monomers such as (meth)acrylamide; N-alkoxy group-containing monomers; N-alkoxyalkyl group-containing monomers such as N-methoxymethyl (meth)acrylamide and N-methoxyethyl(meth)acrylamide; N-alkylol group-containing monomers such as N-methylol(meth)acrylamide, and N-butylol(meth)acrylamide; vinyl halide type monomers such as vinyl fluoride, vinyl chloride, and vinyl bromide; halogen-substituted group-containing monomers such as allyl chloride, 2-chloroethyl (meth)acrylate, and chloromethylstyrene; and olefin monomers such as ethylene, propylene, and butadiene.

The aforementioned (meth)acrylate type polymers containing a monomer having a reactive functional group may be partially crosslinked by utilizing the functional group.

The styrenic resin for forming the surface layer 2*b* of the laminating film of the present invention is exemplified by VINYBLAN 2730 produced by Nisshin Kagaku Kogyo K.K.

The vinyl chloride type resin for forming the surface layer 2*b* of the laminating film of the present invention is exemplified by VINYBLAN 270 produced by Nisshin Kagaku Kogyo K.K.

The vinyl acetate type resin for forming the surface layer 2*b* of the laminating film of the present invention is exemplified by VINYBLAN 1122 produced by Nisshin Kagaku Kogyo K.K.

The surface layer 2*b* of the laminate film of the present invention can be formed by applying an aqueous dispersion (including emulsion) of a resin material as the coating liquid. The coating liquid may be an emulsion of the aforementioned polymer prepared by emulsion polymerization, or an aqueous dispersion prepared by suspending or emulsifying the aforementioned polymer preliminarily synthesized. A coating solution prepared by dissolving the aforementioned polymer may be used practically, provided that it is capable of protecting the surface. Of these, the aqueous dispersion of the resin material prepared by use of an emulsion of the aforementioned polymer is preferred as the coating liquid.

The aqueous dispersion of the resin material formed from the aforementioned emulsion can be produced by a generally known technique. A commercial material may also be used.

The surface layer 2*b* of the laminating film of the present invention can be formed by applying the aforementioned coating liquid on a base material by roll coating, rod bar coating, spray coating, air knife coating, slot die coating, or a like coating method, and drying the applied coating liquid.

On the surface layer 2*b* formed as above, an adhesion layer 2*c* is formed to produce the protecting layer 2*p* of the laminating film of the present invention having the surface layer 2*b* and the adhesion layer 2*c*. Insufficient thickness of the surface layer may cause cracking by internal stress of the layer itself, whereas excessive thickness thereof may impair peeling properties along the printed image. Therefore, the thickness of the surface layer 2*b* ranges preferably from 0.5 to 8 μm, more preferably from 1.0 to 5 μm.

(Adhesion Layer)

The adhesion layer 2*c* of the laminating film of the present invention can also be formed by applying a coating liquid containing an emulsion of a polymer material and drying the coating liquid. The polymer material is preferably a thermoplastic resin or the like which softens sufficiently or fluidizes in the thermocompression step to become compatible with the surface of the printed product.

The adhesive resin material for forming the adhesion layer 2*c* of the laminating film of the present invention includes acrylic resins, vinyl acetate type resins, vinyl chloride type resins, ethylene-vinyl acetate copolymer resins, polyamide resins, polyester resins, polyurethane resins, and polyolefin resins.

For example, the acrylic monomer for production of the acrylic resin includes alkyl ester monomers such as methyl acrylate, ethyl acrylate, propyl acrylate, isopropyl acrylate, butyl acrylate, isobutyl acrylate, pentyl acrylate, hexyl acrylate, heptyl acrylate, octyl acrylate, 2-ethylhexyl acrylate, and nonyl acrylate; and alkoxyalkyl acrylate such as 2-ethoxyethyl acrylate, and 3-ethoxypropyl acrylate.

The emulsion of the adhesive resin material containing the aforementioned acrylic resin or a like polymer can be produced by a generally known technique.

For adjusting the cohesive power of the adhesion layer 2*c* of the laminating film of the present invention, a copolymerizing component may be suitably employed, the copolymerizing component including methacrylate type monomers, vinyl acetate, styrene, acrylonitrile, and (meth) acrylamide. Another method for adjusting the cohesive power of the adhesion layer 2*c* of the laminating film of the present invention is partial crosslinking in which a hydroxyl group-containing monomer such as 2-hydroxyethyl (meth) acrylate and 2-hydroxypropyl (meth)acrylate, or a carboxyl group-containing monomer such as (meth)acrylic acid is introduced into the polymer and the polymer is partially crosslinked by an isocyanate, a blocked isocyanate, an epoxy compound, or the like by utilizing the active hydrogen of the compound.

The adhesion layer 2*c* of the laminating film of the present invention preferably has a thickness sufficient for adhering strongly to an image surface of the printed product, such as the ink-receiving layer having a formed image on a ink-jet recording medium, without formation of air bubbles. The thickness of the adhesion layer 2*c* ranges preferably from 1 to 8 μm, more preferably from 1 to 5 μm. In the lamination treatment of a glossy image surface having Ra of not more than 1.0 μm, the thickness of the adhesion layer 2*c* is selected in the range from 1.0 to 3.0 μm. The upper limit of the layer thickness is determined in consideration of the sharpness of the image or the like observed through the protection layer 2*p*, and the cost.

The adhesion layer 2*c* may be constituted of the aforementioned polymer material as the main constituent for increasing the image density after the lamination, and may contain, for example, BYK-333 produced by BYK-CHEMIE GmbH at a concentration of 5 mass % based on the entire adhesion layer. The adhesion layer may contain, if necessary, carnauba wax, paraffin wax, or the like.

A higher light-resistance of the lamination film can be obtained by incorporating a suitable amount of a UV-absorbing agent into at least one of the surface layer 2*b* and the adhesion layer 2*c* of the laminating film.

The UV-absorbing agent useful in the present invention includes 2-hydroxyphenylbenzotriazole compounds, 2-hydroxybenzophenone compounds, 2,4-diphenyl-6-(2-hydroxyphenyl)-s-triazine compounds, salicylate compounds, and cyanoacrylate compounds. The hydrogen of the benzene ring of the basic skeleton of the above compounds may be substituted by a substituent such as a halogen, alkyl, alkoxy, cyano, nitro, and hydroxyl group.

A polymer material having a UV-absorbing group in the molecular chain may be used in place of, or in combination with the aforementioned UV-absorbing agent. The polymer material having a UV-absorbing group in the molecular chain is preferred since it is less liable to cause deterioration of the performance by volatilization or bleeding.

The UV-absorbing group is preferably introduced into the molecular chain of the polymer material by using the above UV-absorbing agent having a reactive group introduced to the benzene nucleus of the basic skeleton as a monomer. The reactive group is typically exemplified by the group represented by the formula (1) below.

$$—X—OOCC(—H \text{ or } —CH_3)=CH_2 \quad (1)$$

wherein X denotes a divalent group such as an alkylene or oxyalkylene group of 1–12 carbons, and $—CH_2CH(OH)CH_2—$.

The polymer material having a UV-absorbing group in the molecule chain can be obtained by homopolymerizing the compound having a reactive group represented by the formula (1) or copolymerizing the compound with other copolymerizable monomer.

Such polymer materials having a UV-absorbing group in the molecular chain are disclosed in Japanese Patent Application Laid-Open Nos. 06-073368 (Ipposha Yushi Kogyo K.K.), 07–126536 (Ipposha Yushi Kogyo K.K.), 09–118720 (IO Lab. Corp.), 11–348199 (Nippon Shokubai K.K.), 2000–044901 (Ohtsuka Kagaku K.K.), and so forth.

The present invention is specifically explained by reference to Examples and Comparative Examples.

EXAMPLES (1) Laminating Film

Example 1

Coating Liquid 1: Acryl Emulsion T371 (trade name, produced by JSR Co., Tg=85° C., solid matter content: 40 mass %) was used as the coating liquid.

Coating Liquid 2: Acryl Emulsion 2706, trade name, produced by Nisshin Kagaku Kogyo K.K., Tg=21° C., solid matter content: 50 mass %) was dissolved in distilled water and the solid matter content was adjusted to 40% to obtain a coating liquid.

Base Material 1: A PET film (4.5 μm thick) was experimentally prepared as a heat-resistant base material. The base material was measured for the surface roughness (Ra, Rz) with a visual field of 0.35 mm×0.26 mm by means of a three-dimensional surface structure analysis microscope, New View 5000 (trade name, manufactured by Zygo Corporation (USA)). The measurement results are shown in Table 1. The surface roughnesses of the base materials of Examples and Comparative Examples below were measured in the same manner as above.

Coating Liquid 1 was applied on the heat-resistant Base Material 1 by slot die coating in a dry film thickness of 1.2 μm and dried to form a surface layer. Thereon, Coating Liquid 2 was applied in a dry film thickness of 2 μm and dried to form an adhesion layer. Thus, Laminating Film 1 was prepared.

Comparative Example 1

Laminating Film 6 was prepared in the same manner as in Example 1 except that PET Film 5.7RM11 (trade name, produced by Toyo Boseki K.K., 5.7 μm thick), was used as the base material.

Example 2

Coating Liquid 3: A polymeric UV absorber, PUVA 30M (trade name, produced by Ohtsuka Kagaku K.K., Tg=90° C.) was dissolved in toluene, and the solid matter content was adjusted to 25% to obtain a coating liquid.

Coating Liquid 3 was applied on the aforementioned heat-resistant Base material 1 by slot die coating in a dry film thickness of 1.2 μm and dried to form a surface layer. Thereon, Coating Liquid 2 was applied in a dry film thickness of 2 μm and dried to form an adhesion layer. Thus, Laminating Film 2 was prepared.

Comparative Example 2

Laminating Film 7 was prepared in the same manner as in Example 2 except that PET Film 7.4RM19 (trade name, produced by Toyo Boseki K.K., 7.1 μm thick) was used as the base material.

Example 3

Coating Liquid 4: A polymer UV absorber, ULS-1383MA (trade name, produced by Ipposha Yushi Kogyo K.K., Tg=30° C., solid matter content: 30%), was used without treatment as the coating liquid.

Coating Liquid 1 was applied on the heat-resistant Base Material 1 by slot die coating in a dry film thickness of 1.2 μm and dried to form a surface layer. Thereon, Coating Liquid 4 was applied in a dry film thickness of 2 μm and dried to form an adhesion layer. Thus, Laminating Film 3 was prepared.

Comparative Example 3

Laminating Film 8 was prepared in the same manner as in Example 3 except that a PET film, K230-6E (trade name, produced by Mitsubishi Kagaku Polyester Film K.K., 5.9 μm thick), was used as the base material.

Example 4

Base Material 2: A sample base material was prepared by casting/rolling of a PET film, G2 (trade name, produced by Teijin DuPont Film K.K., 16 μm thick), to a thickness of 3.0 μm. The base material was measured for surface roughness with a visual field of 0.35 mm×0.26 mm by means of a three-dimensional surface structure analysis microscope, New View 5000 (trade name, manufactured by Zygo Corporation (USA)).

Coating Liquid 1 was applied on the above heat-resistant Base Material 2 by slot die coating in a dry film thickness of 1.2 μm and dried to form a surface layer. Thereon, Coating Liquid 4 was applied in a dry film thickness of 2 μm and dried to form an adhesion layer. Thus, Laminating Film 4 was prepared.

Example 5

Base Material 3: A test base material was prepared by casting/rolling of a PET film, G2 (trade name, produced by Teijin DuPont Film K.K., 16 μm thick) to a thickness of 4.5 μm. The base material was measured for surface roughness with a visual field of 0.35 mm×0.26 mm by means of a three-dimensional surface structure analysis microscope, New View 5000 (trade name, manufactured by Zygo Corporation (USA)).

Coating Liquid 1 was applied on the above heat-resistant Base Material 3 by slot die coating in a dry film thickness of 1.2 μm and dried to form a surface layer. Thereon, Coating Liquid 4 was applied in a dry film thickness of 2 μm and dried to form an adhesion layer. Thus, Laminating Film 5 was prepared.

Table 1 summarizes the values of the thickness, Ra, and Rz of the base materials used in Examples 1–5 and Comparative Examples 1–3.

TABLE 1

| | Thickness (μm) | Ra (nm) | Rz (nm) |
|---|---|---|---|
| Example 1 | 4.5 | 47 | 2000 |
| Example 2 | 4.5 | 47 | 2000 |
| Example 3 | 4.5 | 47 | 2000 |
| Example 4 | 3.0 | 43 | 1300 |
| Example 5 | 4.5 | 43 | 1300 |
| Comparative Example 1 | 5.7 | 38 | 2700 |
| Comparative Example 2 | 7.4 | 45 | 2500 |
| Comparative Example 3 | 5.9 | 74 | 3500 |

(2) Preparation of Ink-Jet Image-Receiving Sheet and Printed Product

Printing was conducted on ink-jet paper, Photolike QP (trade name, produced by Konica Corp.) by an ink-jet printer, BJ-F870 (trade name, manufactured by Canon K.K.). The RGB data, (R,G,B)=(0,0,0), is given for an image. A black image was formed at O.D.=2.2 which is the maximum possible optical density. In addition, single color patches of yellow, magenta, and cyan were formed at O.D.=2.0 for light-fastness evaluation.

(3) Lamination Treatment of Recording Material

The ink-jet prints (printed products) obtained by the above operation (2) was treated for lamination with the laminating films 1–8 prepared by the procedure shown in the above Item (1) (Laminating Film). More specifically, the apparatus shown in FIG. 1 was employed for the lamination. The laminating film was heated by a thermal head from the base material side. The pressing rubber roll of 12 mm diameter in the printed product side was not heated. The thermal energy was applied with the thermal head divided in two divisions in the thermal head width direction alternately to the two divisions, under the application conditions: voltage of 25 V, application cycle of 3 msec, duty of 80%, nip loading of 40N (200 mm in width; 2N/cm), and feeding speed of 50 mm/sec. Thereby, the protection layer was bonded by hot pressing onto the image surface to form a laminated printed product.

(Evaluation)

(4) 20° Glossiness

20° Glossiness of the surface of the image protection layer of the laminated matter obtained by the treatment (3) above was measured by a gloss meter, VG2000 (trade name, manufactured by Nippon Denshoku K.K.). The one having a 20° surface glossiness of not less than 40 was evaluated to be "good", whereas the one having a 20° surface glossiness of less than 40 was evaluated to be "poor".

Table 2 shows the evaluation results.

TABLE 2

| | 20° Glossiness | Evaluation |
|---|---|---|
| Example 1 | 64 | good |
| Example 2 | 64 | good |
| Example 3 | 64 | good |
| Example 4 | 60 | good |

TABLE 2-continued

| | 20° Glossiness | Evaluation |
|---|---|---|
| Example 5 | 60 | good |
| Comparative Example 1 | 32 | poor |
| Comparative Example 2 | 35 | poor |
| Comparative Example 3 | 30 | poor |

The printed products laminated with the laminating film of Examples 1 to 5 each gave an OD of not less than 2.0 at the black image portion.

The laminated films of Examples 2 and 3 were measured for light-fastness. The laminated films were subjected to 100-hour exposure by means of Atlas Fadeometer (xenon arc), and the remaining optical density was measured. As the results, all of the single color patches had light-fastness with an ink color retention ratio of 70% or more.

The base material is not limited thereto.

In the description of the invention and Examples above, the protection layer is explained specifically for transfer type of protection layer formation with a thermal head. However, the present invention is also applicable to any processes employing heating-pressing means like a heating roller other than the thermal head. The thermal head is especially effective for thin base materials.

In the present invention described above, the base material is peeled off after heat treatment to obtain the laminated product. However, the present invention is highly effective also in lamination with the base material kept unpeeled for protection of photograph, since the base material surface forms the final product surface in this case.

As described above, the present invention provides a laminating film for giving an image with an excellent optical density and glossiness by lamination and is capable of lamination with a low energy, and also provides a process for lamination with the laminating film.

What is claimed is:

1. A laminating film comprising a base material, and an image protection layer formed on the base material and having at least an adhesion layer capable of adhering to an image surface, wherein the base material has a thickness ranging from 1.5 to 6.0 $\mu$m and has an arithmetic average roughness (Ra) of not more than 50 nm and a ten point height of roughness profile (Rz) ranging from 1200 nm to 2000 nm according to JIS B0601.

2. The laminating film according to claim 1, wherein the adhesion layer is capable of adhering to the image surface by heating.

3. The laminating film according to claim 1, wherein the adhesion layer has a thickness of not more than 3 $\mu$m.

4. The laminating film according to claim 1, wherein Ra of the base material is not more than 30 nm.

5. The laminating film according to claim 1, wherein the image protection layer contains a UV-absorbing agent.

6. The laminating film according to claim 5, wherein the image protection layer contains a polymer having a UV-absorbing group in its molecule chain.

7. The laminating film according to claim 1, wherein the image protection layer has a surface layer in contact with the base material, and the base material is so designed as to be peelable from the surface layer.

8. A lamination process for laminating an image protection layer to an image surface of a printed product, comprising the steps of (i) providing the laminating film as set forth in claim 1, and (ii) adhering the adhesion layer of the laminating film to the image surface of the printed product under heating.

9. The process according to claim 8, wherein means for the heating is a thermal head.

10. The process according to claim 8, wherein Ra of the image surface of the printed product is not more than 350 nm.

11. The process according to claim 8, wherein the printed product is prepared by ink-jet recording.

12. The process according to claim 8, further comprising a step for peeling off the base material from the image protection layer after step (ii).

* * * * *

UNITED STATES PATENT AND TRADEMARK OFFICE

CERTIFICATE OF CORRECTION

PATENT NO. : 6,802,925 B2 Page 1 of 1
DATED : October 12, 2004
INVENTOR(S) : Kobayashi et al.

It is certified that error appears in the above-identified patent and that said Letters Patent is hereby corrected as shown below:

Title page,
Item [56], References Cited, FOREIGN PATENT DOCUMENTS, “2002067240 A” should read -- 2002-67240 A --.

Column 1,
Line 31, “makes” should read -- make --.
Line 32, “larger inconveniently.” should read -- inconveniently larger. --.

Column 5,
Line 54, “signifies” should read -- signify --.
Line 57, “include” should read -- includes --.

Signed and Sealed this

Twelfth Day of April, 2005

JON W. DUDAS
*Director of the United States Patent and Trademark Office*